United States Patent Office 3,278,305 Patented Oct. 11, 1966

3,278,305

PHOTOCHEMICAL CROSS-LINKING OF POLYMERS

Urbain Leopold Laridon, Wilrijk-Antwerp, André Jan Conix, Antwerp, and Gérard Albert Delzenne, Kessel-Lo, Belgium, assignors to Gevaert Photo-Producten N.V., Mortsel-Antwerp, Belgium, a Belgian company No Drawing. Filed July 12, 1963, Ser. No. 294,731
11 Claims. (Cl. 96—35.1)

The present invention relates to a process for photochemically decreasing the solubility of polymers, to the production of printing plates, and to printing plates obtained by this process.

It is known to sensitize layers of albumin, gelatin and other colloids by the incorporation of ammonium bichromate. Upon exposing these layers photographically, the exposed areas become insoluble whereas the nonexposed areas remain soluble and can be washed away. A difficulty is that with these layers sensitized with bichromate it is necesssary to perform sensitization just prior to the exposure because the sensitized surface does not keep very well. The problem is to find a process which employs a sensitive layer which is manufactured and thereafter can be stored for considerable periods of time until making the photographic exposure and subsequent processing.

The light-sensitivity of aryl azido compounds has also been described in the literature and their use in the reproduction field has frequently been suggested. Thus, it is well known that aryl azido compounds which are used together with colloids for the production of light-sensitive layers alter the water-solubility of the colloidal substance, such as for example albumin or starch, under the influence of light. They make it less soluble, they tan or harden it, a fact which is utilized for the production of printing plates.

It is an object of the present invention to provide a new class of photochemical cross-linking agents. Another object is to provide improved photographic layers containing these new photochemical cross-linking agents. Still another object is to provide improved photographic resist materials and printing plates for lithography and other related processes. Other objects will become apparent from the following description and examples.

The process for the photochemical cross-linking of polymers in accordance with the invention comprises exposing to actinic light selected portions of a photo-sensitive mixture, which mixture consists of a soluble polymeric material carrying groups which are reactive with photochemically formed isocyanates and of a minor amount of a polycarboxylic acid azide, said polycarboxylic acid azide being capable of forming cross-links with the polymeric material.

The soluble polymeric material forming the main composition of the photo-sensitive mixture carries groups which are reactive with photochemically formed isocyanates. A review of the different groups which are reactive with isocyanates can be found in Chemical Reviews, 57 (1957), 47–76. Among the reactive groups mentioned are especially of value hydroxyl groups, amino groups and thiol groups, although other groups are not to be excluded. As further can be seen in the examples, these reactive groups may be substituted directly on the main polymeric chain as well as on side chains.

The polymeric material carrying the reactive groups may be a natural polymer, a chemically modified natural polymer, a synthetic polymerization, polycondensation or polyaddition product.

Among the natural polymers carrying hydroxyl groups may be mentioned cellulose, starch, dextrin and the like, and their partial esters and ethers as long as they still possess in their structure a substantial amount of free hydroxy groups capable of reacting with isocyanates such as the hydroxyethyl and hydroxypropyl derivatives of cellulose and starch.

Synthetic polymerization products which can be cross-linked according to the process of the invention are polyvinyl alcohol, partly acetalized or esterified polyvinyl alcohol, and copolymers comprising in their polymeric structure a substantial amount of vinyl alcohol groups. In this case the comonomer or comonomers may be chosen between styrene and its nuclear substituted derivatives, vinyl chloride, vinylidene chloride, vinyl esters, vinyl ethers, acrylic and methacrylic acid esters, acrylonitrile, methacrylonitrile, butadiene, and the like. These comonomers are worked up in the synthetic polymerization product in order to provide to the copolymers a maximum of strength and hardness after exposure to light and cross-linking.

In the same way a certain amount of plurally unsaturated monomeric groups may be present in the copolymer, such as divinyl benzene, diglycol diacrylates, N,N′-alkylene-bis-acrylamides and -methacrylamides, N-allyl- and N-methallyl acrylamides, N,N-diallylacrylamide, ethylene diacrylate and triallylcyanurate provided that the photosensitive layer remains soluble when not affected by actinic light.

Synthetic condensation polymers carrying free hydroxyl groups are for instance polyamides carrying hydroxymethyl or hydroxyethyl substituents, and epoxy resins such as the polyether obtained by the polycondensation of 2,2-bis(4-hydroxyphenyl)-propane with epichlorohydrin.

Natural and synthetic polymers containing free amino groups are for instance gelatin, polyvinyl amine, polyaminostyrene, and polyesters which carry free amino substituents along the main polymeric chain.

Thiol groups containing polymeric materials are represented by thiolated gelatin, polythiolstyrene, polyvinylmercaptane, and the condensation product of poly(isophthalylidene-hexamethylene diamine) and thioglycolic acid as described in Example 5 of the Belgian patent specification 622,556.

Minor amounts of polycarboxylic acid azides are added to the above enumerated polymeric materials as photochemical cross-linking agents.

Under the influence of light the polycarboxylic acid azides are probably converted into polyisocyanates. In this way a dicarboxylic acid diazide represented by the formula $$N_3-\overset{\overset{O}{\|}}{C}-R-\overset{\overset{O}{\|}}{C}-N_3$$

will be converted by actinic light rays into a diisocyanate of the formula $$O{=}C{=}N-R-N{=}C{=}O$$

which immediately will react with the reactive groups of the polymeric material present. For instance the reaction with a polymer containing free hydroxyl groups and represented by the formula

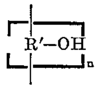

can be written as follows:

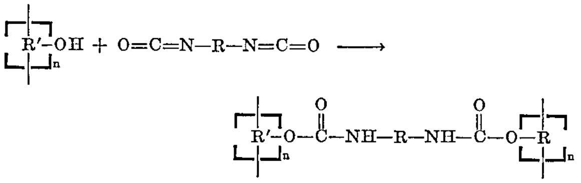

In the same way polymers containing other substituents reactive with isocyanate groups may be cross-linked.

The above reaction scheme is only given by way of explanation of what really occurs when the photosensitive mixture of the invention is exposed to actinic light rays. The invention, however, is independent of the real reaction which occurs and of whatever the mechanism of cross-linking may be.

The polycarboxylic acid azides which are useful as light-sensitive cross-linking agents according to the invention can be manufactured from a large list of aliphatic, aromatic, and heterocyclic polycarboxylic acids by reacting, according to known methods, the acid chlorides of these polycarboxylic acids with sodium azide or by reacting the hydrazides of the polycarboxylic acids with sodium nitrite.

As aliphatic dicarboxylic acid azides can for instance be used diazides of succinic acid, of adipic acid, of pimelic acid, of sebacic acid, and especially of tartaric acid.

Among the azides of aromatic dicarboxylic acids may especially be mentioned isophthalic acid diazide, terephthalic acid diazide and their derivatives such as for instance 5-nitro-isophthalic acid diazide. Azides of polycarboxylic acids having in their structure 2 phenyl groups are also valuable such as bis(4-azidocarboxyphenyl)-ether, 2,2′-bis(4-azidocarboxyphenyl)-propane, bis(4-azidocarboxyphenyl)-dichloromethane and bis(4-azidocarboxyphenyl)-ketone.

Azides from aliphatic-aromatic dicarboxylic acids are also suited such as 2,2-bis(4-azidocarboxy-methoxyphenyl)-propane, and hydroquinone diacetic acid diazide; further axides from olefinic-aromatic dicarboxylic acids such as benzene-1,4-diacrylic acid diazide.

The polycarboxylic acid azides may also be manufactured starting from polycarboxylic acids having more than 2 carboxyl groups such as pyromellitic acid and trimellitic acid. In this way may be manufactured the diazide and the polyazide of pyromellitic acid such as the diazide of pyromellitic acid diallyl- or dimethylester.

Photosensitive cross-linking agents are also found between the heterocyclic polycarboxylic acid azides such as pyridine-2,6-dicarboxylic acid diazide, pyridine-2,5-dicarboxylic acid diazide, and pyridine-2,4-dicarboxylic acid diazide, of which the pyridine-2,6-dicarboxylic acid diazide has been found especially valuable.

The relative proportions of the polymer and the photochemical cross-linking agent may be varied as desired or as conditions may require, but ordinarily the proportions thereof in the mixture will be within the range of about 99 to about 75% of the former to about 1 to about 25% of the latter by weight.

The ideal concentration of the polycarboxylic acid azide naturally will be dependent on the polycarboxylic acid azide used, on the thickness of the photosensitive layer and on the destination of the photoinsolubilized layer. In each individual case the optimum concentration can be determined by trial and error.

Cross-linking of the polymer can be effected to some extent by simply subjecting the mixture of the polymer and of the polycarboxylic acid azide to a source of actinic light rays. However, in order to obtain the optimum degree of insolubilization and a faster reaction, it is preferred to effect the reaction in the presence of catalytic amounts of activating dyes. Among these may be mentioned Michler's ketone, substituted pyrazolines and substituted naphthothiazolines.

The polymeric materials may be exposed to actinic light from any source and of any type. The light source should preferably, although not necessarily, furnish an effective amount of ultraviolet radiation. Suitable sources of light include carbon arcs, mercury vapor lamps, fluorescent lamps, argon glow lamps, photographic flood lamps and tungsten lamps.

For initiating the photochemical cross-linking by means of the polycarboxylic acid azides a very strong light source is not needed. Indeed, in most of the examples described hereinafter, an 80 watt Philips mercury-vapor lamp, placed at a distance of about 15 cm. of the surface to be polymerized, is used. Brighter light sources are generally not needed since at these relatively low light intensities the photochemically cross-linking influence of the polycarboxylic acid azides according to the invention is found to be strong enough.

In the photochemical insolubilization of polymeric materials with polycarboxylic acid azides high temperatures are not needed. The exposure, however, to strong light sources at a relatively short distance, brings about a certain heating of the mass to be cross-linked, which heating exercises a favorable influence upon the cross-linking rate. Indeed the polycarboxylic acid azides proved also to be very effective cross-linking initiators at higher temperature, even in the absence of light.

To the photosensitive compositions may be added minor amounts of compounds which are known to accelerate the photochemical conversion of the acid azide function into an isocyanate function such as trichloro acetic acid as described by Newman and Gildenhorn in Journal of the American Chemical Society 70 (1948), 317. In the same way minor amounts of compounds may be added which are known to accelerate the reaction of the isocyanate function with active hydrogen compounds as described by H. A. Smith in Journal of Applied Polymer Science 7 (1963), 85–95. These known accelerators are for instance triethylene diamine, stannous 2-ethylhexoate, cobaltous stearate and the sodium salt of 1-ethyl-1-(2-hydroxybutyl)-2-butoxyethane.

It has been found that the mixture of polymeric material and of polycarboxylic acid azides according to the invention is photosensitive, in the sense that its exposure to light causes it to be rendered insoluble. Thus, if a layer of one of such a photosensitive mixture, initially soluble, is applied onto a support and exposed photographically, the exposed areas become insoluble.

The invention is valuable in forming plates and films wholly made of the photosensitive mixture. The present process also makes possible the formation of coated printing films on any base by the deposition by any known process of films or coatings of the photosensitive mixture. Typical bases are metal sheets (e.g. copper, aluminum, zinc, etc.), glass, cellulose ester film, polyvinyl acetal film, polystyrene film, polyethylene terephthalate film, etc.

The base or support is coated with a solution of the polymeric material in a suitable solvent, this solution containing dissolved or homogeneously dispersed therein, a photochemical cross-linking polycarboxylic acid azide whereupon the solvent or solvent mixture is eliminated by known means such as evaporation, leaving a more or less thin coating of the photosensitive mixture upon the base or support. Thereafter the dried photosensitive coating is exposed to actinic light rays.

When the support material carrying the photosensitive composition is light-reflecting, there may be present, e.g. superposed on said support and adherent thereto or in the surface thereof, a layer or stratum absorptive of actinic light such as to minimize reflectance from the combined support of incident actinic light.

If the photosensitive composition is water-soluble, water may be used as solvent in coating the support. On the contrary, if water-insoluble photosensitive compositions are used, organic solvents, mixtures of organic solvents or mixtures of organic solvents and water may be used.

The plates formed wholly of or coated with the photosensitive composition are useful in photography, photomechanical reproductions, lithography and intaglio printing. More specific examples of such uses are offset printing, silk screen printing, duplicating pads, manifold stencil sheeting coatings, lithographic plates, relief plates, and gravure plates. The term "printing plates" as used in the claims is inclusive of all of these.

A specific application of the invention is illustrated by a typical preparation of a printing plate. In this application, a plate, usually of metal, is formed wholly of, or coated with a film of the photosensitive composition, and the surface of the plate is then exposed to light through a contacted process transparency, e.g. a process positive or negative (consisting solely of opaque and transparent areas and where the opaque areas are of the same optical density, the so-called line or half-tone negative or positive). The light induces the reaction which insolubilizes the areas of the surface beneath the transparent portions of the image, while the areas beneath the opaque portions of the image, remain soluble. The soluble areas of the surface are then removed by a developer, and the insoluble raised portions of the film which remain can serve as a resist image, while the exposed base material is etched, forming a relief plate, or the plate can be inked and used as a relief printing plate directly in the customary manner.

The thickness of the photosensitive layer is a direct function of the thickness desired in the relief image and this will depend on the subject being reproduced and particularly on the extent of the non-printing areas. In the case of half-tones the screen used is also a factor. In general, the thickness of the photosensitive layer will vary from about 0.001 mm. to about 7 mm. Layers ranging from about 0.001 to about 0.70 mm. in thickness will be used for half-tone plates. Layers ranging from about 0.25 to about 1.50 mm. in thickness will be used for the majority of letterpress printing plates, including those wherein half-tone and line images are to be combined.

The solvent liquid used for washing or "developing" the printing plates made from the photosensitive composition must be selected with care, since it should have good solvent action on the unexposed areas, yet have little action on the hardened image or upon the base material, the non-halation layer, or the anchor layer with which the photosensitive composition may be anchored to the support.

The photosensitive compositions of the invention show many advantages against the known photosensitive compositions. Firstly, since the cross-linking agent is independent from the polymeric material, the latter can be selected in view of the desired application; e.g. when the photosensitive composition is to be applied onto a metal support, the polymeric material can be selected from polyvinylbutyrals and polyepoxy resins, of which the great adhesivity to metals is known. Further, the solubility of the starting material and also the solvent which will be used to "develop" the photographic image can be adapted to the final destination of the photochemically cross-linked polymeric material. A still further advantage of the present photosensitive compositions is that they can be prepared a considerable time before use, unlike the albumin or bichromated gelatin products that must be prepared immediately before use.

The photo cross-linking compositions are suitable for other purposes in addition to the printing uses described above, e.g. as ornamental plaques or for producing ornamental effects; as patterns for automatic engraving machines, foundry molds, cutting and stamping dies, name stamps, relief maps for braille, as rapid cure coatings, e.g. on film base; as variable area and variable density sound tracks on film; for embossing plates, paper, e.g. with a die prepared from the photopolymerizable compositions; in the preparation of printed circuits; and in the preparation of other plastic articles.

The photo cross-linking initiators of the invention can be used as ultraviolet curing catalysts for systems where low heat is a requirement in the curing of a particular part, and sunlight or other source of ultraviolet light are readily available.

The following examples illustrate the present invention.

*Example 1*

To a 5% solution in sym-tetrachloroethane of the polyether of 2,2-bis(4-hydroxyphenyl)-propane and epichlorohydrin, containing recurring units of the following formula:

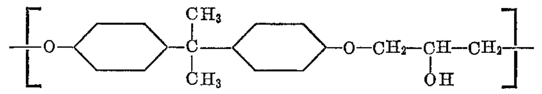

is added an amount as hereinafter defined of isophthalic acid diazide.

This solution is coated onto an aluminum foil in such a way that after evaporating the solvent a layer of 1 to 5$\mu$ thickness remains.

A negative process transparency is laid upon said layer which is then exposed for a certain time to an 80 watt Philips mercury-vapor lamp. Thereupon the unexposed areas are washed away with sym-tetrachloroethane. The results obtained are listed in the following table. Said table shows also the results obtained for some tests carried out in the same way as above with the difference, however, that to the solution used for coating the layer 1% by weight of the amount of polyether present of Michler's ketone is added as activator.

| Percent by weight of diazide added with respect to the amount of polymer | Distance of the light-source in cm. | Activator | Exposure time required, min. |
|---|---|---|---|
| 100 | 5 | -------- | 15 |
| 50 | 5 | -------- | 15 |
| 10 | 5 | -------- | 5 |
| 5 | 5 | (1) | 1 |
| 5 | 15 | (1) | 10 |

[1] Michler's ketone.

*Example 2*

To a 5% solution of the polyether of Example 1 in sym-tetrachloroethane 5% by weight of terephthalic acid diazide and 1% by weight of Michler's ketone with respect to the amount of the polymer are added.

The solution is coated onto an aluminum foil in such a way that after drying a layer of 1 to 5$\mu$ thickness remains. The layer is exposed through a process transparency to an 80 watt Philips mercury-vapor lamp placed at a distance of 15 cm. The unexposed areas are washed away with sym-tetrachloroethane. For obtaining a good relief image an exposure time of 5 minutes is required.

*Example 3*

The method of Example 2 is repeated using, however, 5% by weight of bis-(4-azidocarboxy phenyl)-ether instead of terephthalic acid diazide. After an exposure time of 10 minutes, the light source being placed at a distance of 15 cm., a good relief image is obtained.

*Example 4*

The method of Example 2 is repeated, however, 10% by weight of 2,2-bis(4-azidocarboxy phenyl)-propane instead of 5% by weight of terephthalic acid diazide. After an exposure time of 10 minutes, the light source being placed at a distance of 15 cm., a good relief image is obtained.

*Example 5*

The method of Example 2 is repeated using, however, 5% by weight of benzene-1,4-diacrylic acid diazide instead of 5% by weight of terephthalic acid diazide. After an exposure time of 10 minutes, the light source being placed at a distance of 15 cm., a good relief image is obtained.

*Examples 6–12*

To show the influence of various activators upon the photochemical cross-linking a series of tests is carried out.

There is started from the following solution:

| | |
|---|---|
| Sym-tetrachloroethane ccs. | 5 |
| Polyether of 2,2-bis(4-hydroxyphenyl)-propane and epichlorohydrin g. | 0.250 |
| Isophthalic acid diazide g. | 0.025 |
| Activator (see table below) g. | 0.0025 |

The above-mentioned solution is coated onto an aluminum foil, a zinc foil or a copper foil in such a way that after drying a layer of about 5μ thickness remains.

The layer thus formed is exposed to an 80 watt Philips mercury-vapor lamp placed at a distance of 15 cm. The unexposed areas are washed away with sym-tetrachloroethane. The results obtained are listed in the following table.

| Example | Activator | Exposure time required, min. |
|---|---|---|
| 6 | None | 15 |
| 7 | Michler's ketone | 5 |
| 8 | 1,3-diphenyl-5-p-hydroxyphenyl pyrazoline | 6 |
| 9 | 1,3-diphenyl-5-p-chlorophenyl pyrazoline | 7 |
| 10 | 1,3-diphenyl-5-p-iodophenyl pyrazoline | 8 |
| 11 | 1-p-carboxyphenyl-3-phenyl pyrazoline | 6 |
| 12 | 2-benzoylmethylene-1-methyl-β-naphthothiazoline | 6 |

When in the above-mentioned examples a minor amount of chloroacetic acid is added to accelerate the decomposition of the azide groups and when triethylamine is added whereby the urethane formation is accelerated, slightly better results are obtained.

*Examples 13–16*

The method of Examples 6–12 is repeated using, however, instead of isophthalic acid diazide a same amount of pyridine-2,6-dicarboxylic acid diazide. The following results are obtained.

| Example | Activator | Exposure time required |
|---|---|---|
| 13 | None | 3 min. |
| 14 | Michler's ketone | 45 sec. |
| 15 | 1,3-diphenyl-5-p-hydroxyphenyl pyrazoline | 2 min. |
| 16 | 2-benzoylmethylene-1-methyl-β-naphthothiazoline. | 1 min. |

*Examples 17–24*

The method of Examples 6–12 is repeated using, however, instead of isophthalic acid diazide a same amount of a series of diazides as listed in the following table. The following results are obtained.

| Example | Diazide used | Activator | Exposure time required, min. |
|---|---|---|---|
| 17 | Tartaric acid diazide | Michler's ketone. | 15 |
| 18 | 5-nitro-isophthalic acid diazide | None | >15 |
| 19 | 5-nitro-isophthalic acid diazide | Michler's ketone. | 15 |
| 20 | Pyridine-2,5-dicarboxylic acid diazide. | do | 3 |
| 21 | Hydroquinone diacetic acid diazide. | do | 10 |
| 22 | Pyridine-2,4-dicarboxylic acid diazide. | do | 2 |
| 23 | Benzophenone-p,p'-dicarboxylic acid diazide. | do | 10 |
| 24 | Pyromellitic acid dimethyl ester diazide. | do | 4 |

*Example 25*

The following solution is prepared:

| | |
|---|---|
| Polycondensation product of poly(isophthalylidene hexamethylene diamine) and thioglycolic acid (prepared as described in Example 5 of the Belgian patent specification 622,556) g. | 0.250 |
| Sym-tetrachloroethane ccs. | 5 |
| Isophthalic acid diazide g. | 0.025 |
| Michler's ketone g. | 0.005 |

From this solution a layer is coated and further treated as in Examples 6–12. The exposure time required for obtaining a good relief image is 10 min.

*Example 26*

The method of Example 25 is repeated using, however, pyridine-2,6-dicarboxylic acid diazide instead of isophthalic acid diazide. The exposure time required for obtaining a good relief image is 5 min.

*Example 27*

1 g. of poly(vinylbutyral) still bearing 20% of free hydroxyl groups is dissolved in 10 ccs. of 1,1,2-trichloroethane and 2 ccs. of methanol, whereafter a solution of 0.05 g. of isophthalic acid diazide in 5 ccs. of 1,1,2-trichloroethane is added while stirring.

The solution obtained is coated onto an aluminum foil in such a way that after drying a layer of about 5μ thickness is obtained. Said layer is exposed through a negative to an 80 watt Philips mercury-vapor lamp placed at a distance of 5 cm. whereupon it is developed in methanol. A good relief image is obtained after an exposure time of 10 min.

*Example 28*

The method of Example 27 is repeated with the difference, however, that 0.01 g. of Michler's ketone is added as activator to the solution. After an exposure time of 10 min., the 80 watt Philips mercury-vapor lamp being placed at a distance of 15 cm., a good relief image is obtained.

*Example 29*

The method of Example 27 is repeated with the difference, however, that terephthalic acid diazide is used instead of isophthalic acid diazide and that 0.01 g. of Michler's ketone is added to the solution as activator. After an exposure time of 5 minutes, the 80 watt Philips mercury-vapor lamp being placed at a distance of 15 cm., a good relief image is obtained.

*Example 30*

The method of Example 27 is repeated with the difference, however, that bis(4-azidocarboxyphenyl) ether is used instead of isophthalic acid diazide and that 0.01 g. of Michler's ketone is used as activator. A good relief image is obtained after an exposure time of 7 min., the 80 watt Philips mercury-vapor lamp being placed at a distance of 15 cm.

*Example 31*

1 g. of a polyamide containing recurring units of the following general formula:

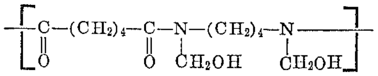

is dissolved in a mixture of 6 ccs. of methanol and 4 ccs. of 1,1,2-trichloroethane. To this solution 0.05 g. of isophthalic acid diazide is added.

The solution is coated onto an aluminum foil in such a way that after drying a layer of about 10$\mu$ thickness remains. The layer is exposed for 15 min. through a negative to an 80 watt Philips mercury-vapor lamp placed at a distance of 5 cm. whereupon it is developed with methanol. A good relief image is obtained.

We claim:

1. Process for the photochemical cross-linking of polymers which comprises exposing to actinic light selected portions of a photosensitive mixture, which mixture consists of a soluble polymeric material carrying groups which are reactive with photochemically formed isocyanates and of a minor amount of a polycarboxylic acid azide, said polycarboxylic acid azides being capable of forming cross-links with the polymeric material.

2. Process according to claim 1 wherein the polymeric material is a polyether obtained by the polycondensation of 2,2-bis(4-hydroxyphenyl)-propane with epichlorohydrin.

3. Process according to claim 1 wherein the polymeric material is polyvinylbutyral containing a substantial amount of free hydroxyl groups.

4. Process according to claim 1 wherein the polycarboxylic acid azide is a heterocyclic dicarboxylic acid azide.

5. Process according to claim 4 wherein the heterocyclic dicarboxylic acid azide is pyridine-2,6-dicarboxylic acid diazide.

6. Process according to claim 1 wherein the polycarboxylic acid azide is an aromatic dicarboxylic acid azide.

7. Process according to claim 6 wherein the aromatic dicarboxylic acid azide is isophthalic acid diazide.

8. Process according to claim 6 wherein the aromatic dicarboxylic acid azide is terephthalic acid diazide.

9. Process for producing photographic resist images by the photochemical cross-linking of a polymeric material, characterized thereby that a photographic element is exposed to actinic light through a process transparency, said photographic element comprising a support having thereon a photosensitive layer comprising a soluble polymeric material carrying groups which are reactive with photochemically formed isocyanates, and a minor amount of a polycarboxylic acid azide being capable of forming cross-links with the polymeric material, whereby in the exposed areas said polymeric material is cross-linked to the insoluble state, and removing the soluble photosensitive composition in the unexposed areas, thereby forming a photographic resist image.

10. Process for producing a photographic printing plate by the photochemical cross-linking of a polymeric material, characterized thereby, that a photographic element is exposed to actinic light through a process transparency, said photographic element comprising a support having thereon a photosensitive layer comprising a soluble polymeric material carrying groups which are reactive with photochemically formed isocyanates, and a minor amount of a polycarboxylic acid azide, said polycarboxylic acid azide being capable of forming cross-links with the polymeric material, whereby in the exposed areas said polymeric material is cross-linked to the insoluble state, and removing the layer in the non-exposed areas.

11. Photographic printing plates as produced by the process of claim 10.

No references cited.

J. TRAVIS BROWN, *Acting Primary Examiner.*

R. H. SMITH, *Assistant Examiner.*